United States Patent
Bezoza et al.

(10) Patent No.: US 7,567,507 B1
(45) Date of Patent: Jul. 28, 2009

(54) SHARED BANDWIDTH RESERVATION IN PL, ATM, FR AND IP/MPLS NETWORKS

(75) Inventors: Teddy Bezoza, Marlboro, NJ (US); Bruce Gilbert Cortez, Marlboro, NJ (US); Sanja Durinovic-Johri, Aberdeen, NJ (US); Karel Ehrlich, Fair Haven, NJ (US); Pravin Kumar Johri, Aberdeen, NJ (US)

(73) Assignee: AT&T Corp., New York, NY (US)

( * ) Notice: Subject to any disclaimer, the term of this patent is extended or adjusted under 35 U.S.C. 154(b) by 351 days.

(21) Appl. No.: 11/634,214

(22) Filed: Dec. 6, 2006

Related U.S. Application Data

(63) Continuation of application No. 10/165,816, filed on Jun. 7, 2002, now Pat. No. 7,164,653.

(51) Int. Cl.
*G01R 31/08* (2006.01)
(52) U.S. Cl. .................. 370/228; 370/395.21; 370/468
(58) Field of Classification Search .................. None
See application file for complete search history.

(56) References Cited

U.S. PATENT DOCUMENTS

| | | | |
|---|---|---|---|
| 5,315,586 A * | 5/1994 | Charvillat | 370/232 |
| 5,646,936 A | 7/1997 | Shah et al. | |
| 5,859,836 A | 1/1999 | Eslambolchi | |
| 5,884,017 A | 3/1999 | Fee | |
| 6,005,997 A | 12/1999 | Robinson et al. | |
| 6,038,044 A | 3/2000 | Fee et al. | |
| 6,052,210 A | 4/2000 | Nathan | |
| 6,097,696 A | 8/2000 | Doverspike | |
| 6,130,876 A | 10/2000 | Chaudhuri | |
| 6,324,162 B1 | 11/2001 | Chaudhuri | |
| 6,344,162 B1 | 2/2002 | Miyajima | |
| 2003/0185217 A1 * | 10/2003 | Ganti et al. | 370/395.5 |

* cited by examiner

*Primary Examiner*—Jayanti K Patel
*Assistant Examiner*—Jung Park
(74) *Attorney, Agent, or Firm*—Banner & Witcoff, Ltd.

(57) ABSTRACT

A method and a system for allocating restoration capacity in a network link in a communications network provides that a common pool of communication capacity is provisioned in a network link, such that the common pool of communication capacity includes spare capacity for new service and restoration capacity. A pool of pre-allocated communication capacity for future growth of at least one connection in the network link is also provisioned. The pool of pre-allocated communication capacity for future growth is available for restoration capacity, but not for spare capacity for new service. The communications network can be, for example, a private line (PL) network, a SONET-based network, an Asynchronous Transfer Mode (ATM)-based network, an Internet Protocol/MultiProtocol Label Switching (IP/MPLS)-based network or a frame relay (FR)-based network.

24 Claims, 4 Drawing Sheets

SHARED BANDWIDTH RESERVATION IN PL, ATM, FR AND IP/MPLS NETWORKS

CROSS-REFERENCE TO RELATED APPLICATION

This application is a continuation of U.S. Ser. No. 10/165,816 filed Jun. 7, 2002, now U.S. Pat. No. 7,164,653, issued Jan. 16, 2007, and is incorporated by reference herein.

BACKGROUND OF THE INVENTION

1. Field of the Invention

The invention relates to telecommunications. More particularly, the present invention relates to a method and a system for reserving bandwidth for connection in a link in a communications network so that the reserved bandwidth is available for restoration.

2. Background of the Related Art

In Private Line (PL) networks, a customer can buy a point-to-point connection, such as an OC12c connection. The point-to-point connection could be formed from several sub-connections that have been co-routed and provisioned by the network over, for example, a number of switches that are connected by OC48 links. Such a connection is often referred to as a compound or bundled connection. In time, as the point-to-point connection traffic increases and/or when the customer adds more sub-connections to the compound connection, the point-to-point connection is required to grow in size. The increase can be hitless when all of the OC48s links over which the point-to-point connection is routed have sufficient spare bandwidth to accommodate the growth. If not, the point-to-point connection may be required to be re-provisioned and another route is needed that has the necessary bandwidth on each link in the route. As the connection size increases, the likelihood that the increase will be hitless becomes less, and the task of re-provisioning and rerouting the connection becomes more difficult.

When switch and link failures occur in a network, connections on a failed switch or link break and must be restored. Conventional network links maintain spare capacity in a common pool, or group, that is used for both service provisioning and for restoration of broken connections. Restoration is generally a temporary condition because when the failure is repaired, each restored connection is "reverted" from the restoration path back to the original (service) path. The spare capacity, though, does not necessarily allow a connection to grow when needed because connections are assigned to OC48s links in a way that maximizes the likelihood of accommodating large new or restored connections, but can quickly leave little or no spare capacity for growth for a provisioned connection.

FIG. 1 shows a functional block diagram of an exemplary communication network 100 having multiple links between switches. Communications network 100 includes switches (SW) 101-104, links 111-118 and drop ports 121-125. As shown in FIG. 1, SW 101 is connected to SW 102 through links 111-113. SW 102 is connected to SW 103 through links 114 and 115. SW 103 is connected to SW 104 through links 116-118. SW 101 has drop ports 121 and 122, SW 103 has drop port 124, and SW 104 has drop ports 123 and 125. Switches 101-104 exchange a conventional link state advertisement (LSA) message to provide information about the topology (switches, links and link metrics) in the network, as well as the total capacity and the spare capacity on each link. Links 111-118 are typically OC48 links, but could also be either higher or lower speed links.

An exemplary connection 131 is shown in FIG. 1 connected between drop port 121 on SW 101 and drop port 123 on SW 104 through communications network 100. The path of connection 131 through communications network 100 includes link 112 between SW 101 and SW 102, link 114 between SW 102 and SW 103, and link 118 between SW 103 and SW 104. Links 112, 114 and 118 are, for example, OC-48 links, and connection 131 is, for example, an STS-12 connection that uses 12 STS-1 slots out of the 48 slots that are available in each of links 112, 114 and 118. The remaining slots in links 112, 114 and 118 are used by other connections that are not shown or are spare (available). Another exemplary connection 132 is shown in FIG. 1 connected between drop port 124 on SW 103 and drop port 125 on SW 104. The path of connection 132 through communications network 101 includes link 118 between SW 103 and SW 104. Connection 132, for example, could be an STS-3 connection that uses 3 STS-1 slots out of the 48 total slots on link 118.

Suppose that, for example, the capacity pool for link 114 has a total of 48 slots, and suppose that out of the 48 slots, only connection 131 is using 12 slots of the 48 slots. FIG. 2 is a diagram representing the conventional capacity pools of link 114. Of the 48 slots of total capacity, 12 slots are in a service capacity pool 201 and 36 slots are in a spare capacity pool 202. The 36 slots of spare capacity in pool 202 would be available for new service connections and/or for restoring connections that fail elsewhere. For this example, SW 102 and SW 103 would each send a LSA message to neighboring switches advertising that link 114 has 36 spare slots that are available. The LSA messages are propagated to all other switches in the network using the conventional method of LSA flooding.

Suppose that the total capacity pool for link 118 is also 48 slots. Connection 131 would use 12 slots of the total capacity and connection 132 would use 3 slots of the total capacity for a total of 15 slots in a service capacity pool. Thus, 33 slots in a spare capacity pool would be available on link 118 for new service connections and/or for restoring connections that fail elsewhere. Switch 103 and SW 104 would each send a conventional LSA to the other switches advertising that link 118 has 33 spare slots that are available.

FIG. 3 shows a flow diagram 300 of an exemplary conventional general procedure that is used for setting up a connection, whether for new service or for restoration. At step 301, a request for a connection is received. At step 302, a network graph is constructed using information contained in the LSA messages. At step 303, links having insufficient spare capacity for the requested connection are pruned from the network graph. At step 304, the shortest path for the connection in the remaining network graph is determined using, for example, a well-known algorithm such as the Dijkstra algorithm. At step 305, the connection is set up along the shortest path determined in step 304. It should be understood that flow diagram 300 has been simplified to not include steps that are performed when any of steps 301-305 cannot be performed.

In order to perform step 305 in FIG. 3, the switch originating the connection sends out a setup message along the selected path. The setup message contains the selected path, as well as the bandwidth that is needed by the connection and, possibly, other metric information. FIG. 4 is a diagram representing a format arrangement 400 of a conventional Connection Setup Message. Conventional Connection Setup Message format arrangement 400 includes a field 401 containing information relating to the path of a connection, a field 402 containing information relating to bandwidth required for the connection and other fields that are not shown in FIG. 4. The Connection Setup Message is processed by each switch in the selected path. When the connection can be established at a switch—that is, the requested bandwidth is available—the switch forwards the setup message to the next switch in the selected path. Otherwise, the switch sends a ("crankback") message to the originating switch indicating that the connection could not be established.

Returning to FIG. 1, suppose that it is desirable to increase the size of connection 131 from an OC12c to an OC24c. Growth can only occur on the existing path when an additional 12 slots are free (i.e., in the spare capacity pool) on each of links 112, 114 and 118. Otherwise, the growth cannot be accommodated on the existing path and the connection must be re-routed on a different set of links, each of which must have 24 spare slots available. Accordingly, there is a possibility that connection 131 might be required to be rerouted via a different set of switches that are not shown in FIG. 1. The reroute will cause a transmission hit while the connection is torn down over the original path and then set up on the new path.

Conventional connection routing attempts to maximize the fill of partially filled links and is based on the concept of leaving as large a pool of spare capacity as possible on other links, thereby being able to accommodate large connections. Consequently, connections established after connection 131 has been established are likely to be routed on links used by 131 if those connections share part or the same entire path with connection 131. Over time, the conventional approach uses up spare capacity on links used by connection 131 and reduces the probability that there will be sufficient spare capacity for connection 131 to grow. Thus, there may be sufficient capacity on other links, but growth of connection 131 causes a transmission hit.

One possible approach to overcome this disadvantage is to reserve, or pre-allocate, capacity for future growth of connection 131 when connection 131 is initially provisioned. Spare bandwidth could be reserved when connection 131 is originally set up by setting connection 131 to be a larger connection than is initially needed. For example, suppose that when connection 131 is initially set up, an additional 12 slots are reserved. The 48 total slots of capacity on link 114 are now configured as 24 slots in the service capacity pool and 24 slots in the spare capacity pool. Only 24 slots of spare capacity are available for new service connections and/or for restoring connections that fail elsewhere. No other connection, including a restoration connection, can use the capacity reserved by connection 131 because the reserved bandwidth is not currently available for any other purpose except for future growth of the connection. Thus, the reserved capacity that is within the service capacity pool is unused until the provisioned connection requires the reserved bandwidth. Accordingly, a conventional LSA message will advertise link 114 has 24 spare slots that are available.

What is needed is a way of reserving bandwidth for a single or a compound connection in a link in a communications network to allow for future growth of the connection, while making the reserved bandwidth available for restoration so that the reserved bandwidth is not wasted.

BRIEF SUMMARY OF THE INVENTION

The present invention provides a way of reserving bandwidth for a single or a compound connection in a link in a communications network to allow for future growth of the connection, while making the reserved bandwidth available for restoration so that the reserved bandwidth is not wasted.

The advantages of the present invention are provided by a method and a system for allocating restoration capacity in a network link in a communications network. A common pool of communication capacity is provisioned in a network link, such that the common pool of communication capacity includes spare capacity for new service and restoration capacity. A pool of pre-allocated communication capacity for future growth of at least one connection in the network link is also provisioned. The pool of pre-allocated communication capacity for future growth is available for restoration capacity, but not for spare capacity for new service. Accordingly, the communications network can be, for example, a private line (PL) network, a SONET-based network, an Asynchronous Transfer Mode (ATM)-based network, an Internet Protocol/MultiProtocol Label Switching (IP/MPLS)-based network or a frame relay (FR)-based network. A connection for which the pool of pre-allocated communication capacity for future growth has been provisioned can be a single or a compound connection. Provisioning of the pool of pre-allocated communication capacity can be performed in response to a received connection request or in response to a received connection setup message. In that regard, the connection setup message includes information indicating whether the connection setup is for one of a new service connection and a restoration connection and information relating to an amount of communication capacity reserved for the connection setup. After the common pool of communication capacity and the pool of pre-allocated communication capacity have been provisioned, a connection setup message is sent to another node within the communications network requesting a connection setup. Alternatively, a link state advertisement message is sent to another node within the communications network after the common pool of communication capacity and the pool of pre-allocated communication capacity are provisioned. The link state message includes information relating to restoration capacity of the network link.

Another aspect of the invention provides a method and a system in which a connection setup message is received, and it is determined whether the connection setup message is for a new service connection or for a restoration connection. Communication capacity for a new service connection is allocated from the common pool of communication capacity when the connection setup message is for a new service connection. Communication capacity for the restoration connection is allocated from one of the common pool of communication capacity and the pool of pre-allocated communication capacity for future growth when the connection setup message is for a restoration connection.

Yet another aspect of the invention provides a method and a system for restoring communications in a network in which a connection setup message is received for a restoration connection in a link of the network, and communication capacity for the restoration connection is allocated from one of a common pool of communication capacity and a pool of pre-allocated communication capacity for future growth, such that the common pool of communication capacity includes spare capacity for new service and restoration capacity for the network link, and the pool of pre-allocated communication capacity for future growth is available for restoration capacity, but not for spare capacity for new service.

BRIEF DESCRIPTION OF THE DRAWINGS

The present invention is illustrated by way of example and by not limitation in the accompanying figures in which like reference numerals indicate similar elements and in which.

DETAILED DESCRIPTION OF THE INVENTION

The present invention provides a method and a system for reserving, or pre-allocating, bandwidth for a single or a compound connection in a link in a telecommunications network for allowing for future growth of the connection and for making the reserved, or pre-allocated, bandwidth available for restoration so that the reserved bandwidth is not wasted. In that regard, the present invention provides pre-allocated bandwidth for a connection in one of several predetermined sizes, such as OC6, OC12, OC24, OC48 and OC96. Additionally or alternatively, the present invention can provide pre-allocated bandwidth for a connection as a portion of one of several predetermined sizes. For example, a compound connection can be provisioned empty such that all of the pre-allocated bandwidth initially is available for restoration purposes, thereby easing provisioning and simplifying operation of support systems. Customers can buy an appropriately sized connection, such as a DS3, an OC3 or an OC12 connection. Smaller sized connections, such as a DS3 or an OC3 connection, can be combined into a larger connection, such as an OC12 connection. As the connection grows, the pre-allocated bandwidth is used by the connection. According to the present invention, any unused pre-allocated bandwidth is available for restoration purposes, but is not available for new service provisioning. Thus, the present invention provides two pools of spare capacity within a network link. The first pool is a conventional spare capacity pool and the second pool is a reserved, or pre-allocated, capacity pool. The conventional spare capacity pool functions conventionally and is available for both new service and restoration. The reserved capacity pool is available for growth of connections to which it was allocated and for restoration purposes. Only connections that can be reverted are allowed use the pool of pre-allocated capacity because restoration is temporary in nature and the restored circuits revert back relatively quickly to their home routes when a failure condition has been repaired.

The capacity pools that are associated with a network link are configured differently and used differently by the present invention. To illustrate the differences between the present invention and conventional techniques, return to the earlier example in which capacity was conventionally reserved, or pre-allocated, for future growth when link 114 was initially provisioned for connection 131. In the earlier example, connection 131 was allocated 12 slots of service capacity and 12 slots of reserve capacity for link 114. The 48 total slots of capacity on link 114 were then configured as 24 slots in the service capacity pool and 24 slots in the spare capacity pool. The 24 slots of spare capacity were available for new service connections and/or for restoring connections that fail elsewhere.

Figure 1:
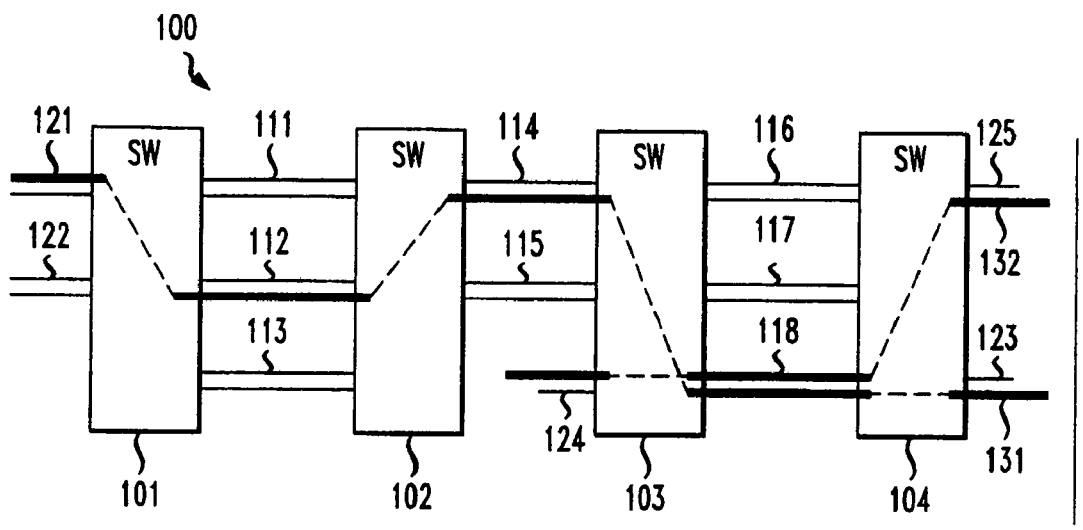
FIG. 1 shows a functional block diagram of an exemplary communication network having multiple links between switches.
Figure 2:
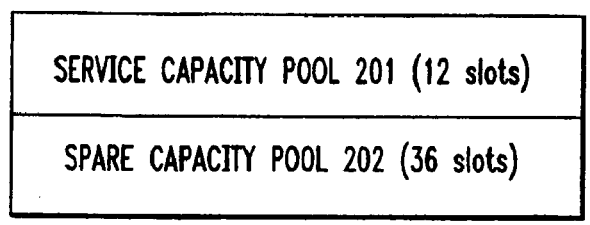
FIG. 2 is a diagram representing the exemplary conventional capacity pools of a link in the communications network shown in FIG. 1.
Figure 3:
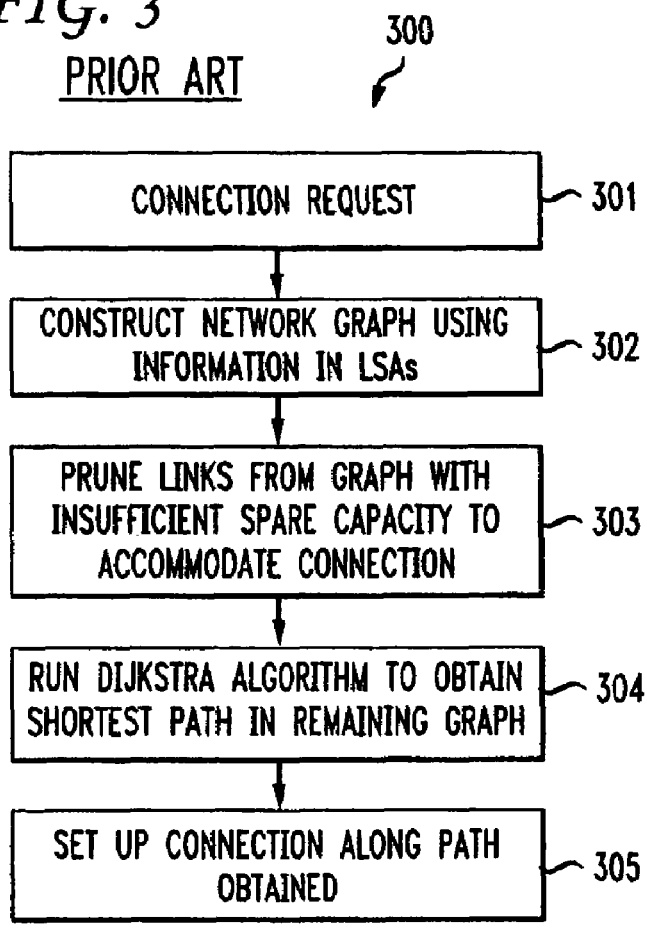
FIG. 3 shows a flow diagram of an exemplary conventional general procedure that is used for setting up a connection.
Figure 4:
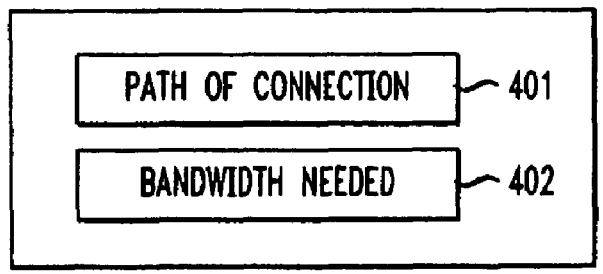
FIG. 4 is a diagram representing a format arrangement for a conventional Connection Setup Message.
Figure 5:
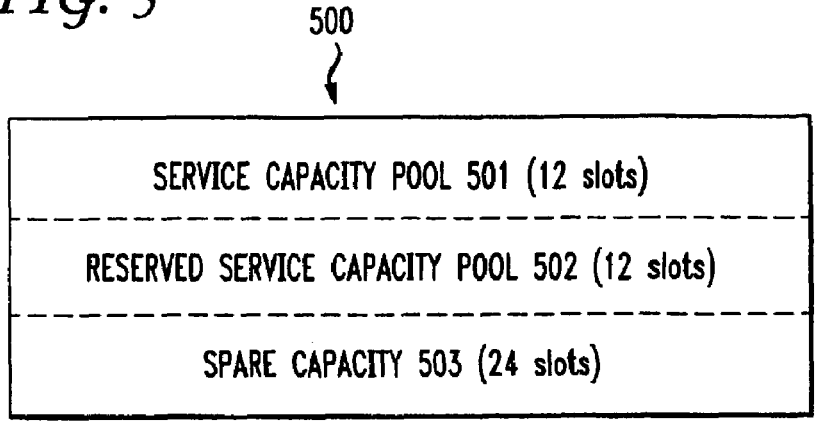
FIG. 5 is a diagram representing exemplary capacity pools of a link in the communications network shown in FIG. 1 according to the present invention.

The present invention modifies the spare capacity pool for link 114 so that 48 slots of capacity would be a pool of 12 slots of service capacity, a pool of 12 slots of reserved (pre-allocated) capacity and 24 slots of spare capacity. FIG. 5 is a diagram representing exemplary capacity pools 500 for link 114 according to the present invention for this example. As shown in FIG. 5, the 48 slots of total capacity for link 114 would be divided into a service capacity pool 501 that has 12 slots allocated to connection 131, a reserved (pre-allocated) capacity pool 502 that has 12 slots pre-allocated for connection 131, and a spare capacity pool 503. Both the service capacity pool 501 and the reserved capacity pool 502 could also have slots allocated to other connections. Accordingly, 24 slots would be available as spare capacity (pool 503) and 36 slots would be available for restoration as the 24 slots that are available as spare capacity (spare capacity pool 503) plus the 12 slots that are reserved for growth of connection 131 (reserved capacity pool 502).

Switch 102 would exchange a modified LSA message advertising 24 spare slots that are available for service and 36 spare slots for restoration on link 114. A modified LSA message, according to the present invention, includes additional information relating to restoration capacity.

Figure 6:
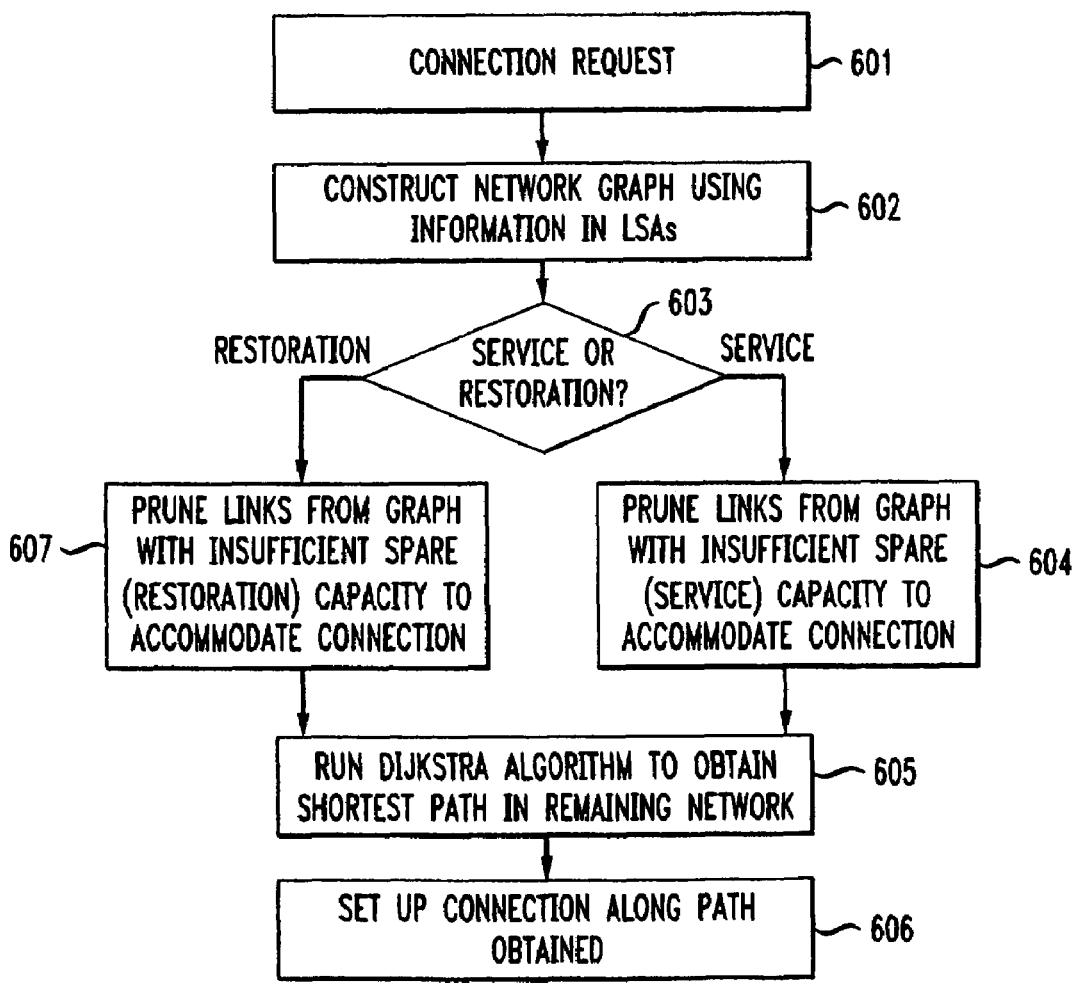
FIG. 6 shows a flow diagram of an exemplary embodiment of a procedure that is used for setting up a connection according to the present invention.

FIG. 6 shows a flow diagram 600 of an exemplary embodiment of a procedure that is used for setting up a connection, whether for new service or for restoration, according to the present invention. At step 601, a request for a connection is received. At step 602, a network graph is constructed using information contained in the LSA messages. At step 603, it is determined whether the connection request is for new service or for restoration. If, at step 603, the request is for new service, flow continues to step 604 where links having insufficient spare service capacity (i.e., no reserved capacity) for the requested connection are pruned from the network graph. Flow continues to step 605, where the shortest path for the connection in the remaining network graph is determined using, for example, a well-known algorithm such as the Dijkstra algorithm. At step 606, the connection is set up along the shortest path determined in step 605.

If, at step 603, it is determined that the connection request is for restoration, flow continues to step 607 where links having insufficient spare restoration capacity (i.e., spare service capacity plus reserved capacity) for the requested connection are pruned from the network graph. Flow continues to step 605. It should be understood that flow diagram 600 has been simplified by not including steps that are performed when any of steps 601-607 cannot be performed.

Figure 7:
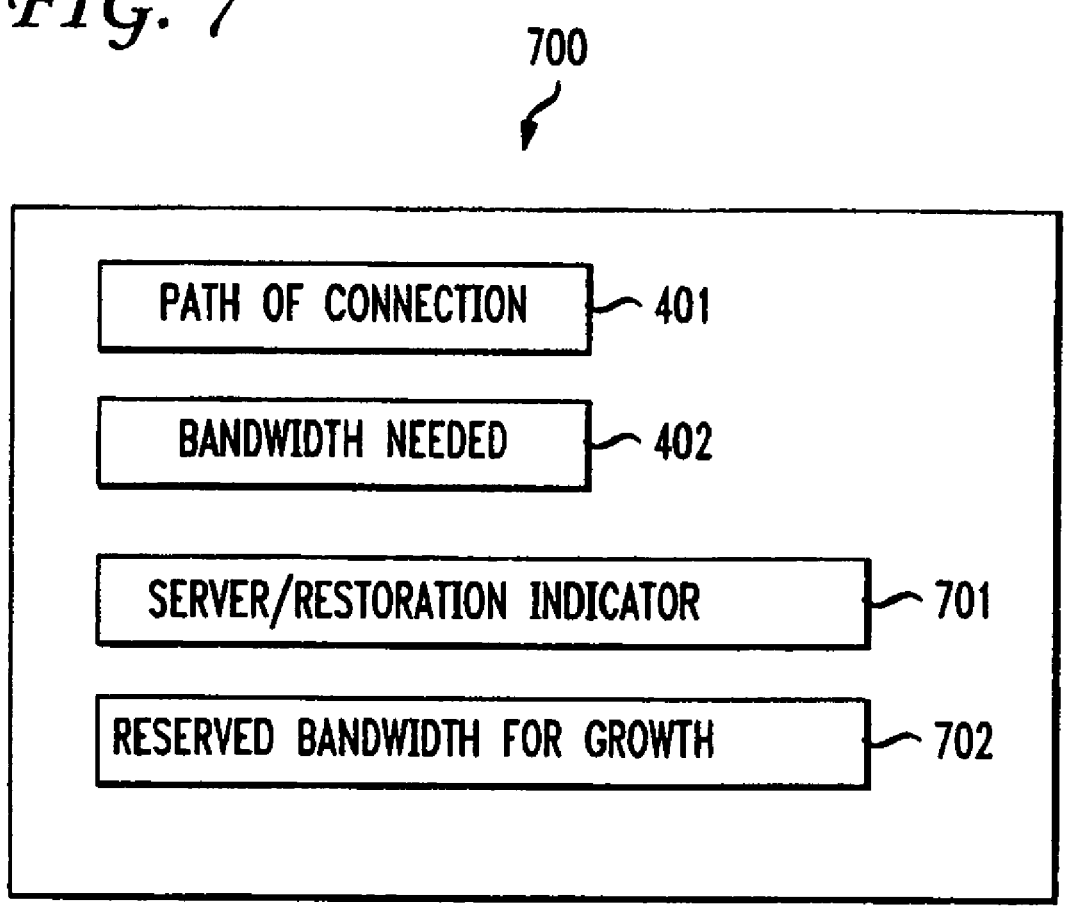
FIG. 7 represents an exemplary format for a modified Connection Setup Message according to the present invention.

In step 606 in FIG. 6, a modified Connection Setup Message is sent along the path obtained by step 605. A modified Connection Setup Message, according to the present invention, includes information indicating whether the setup is for new service or restoration, and whether any bandwidth is reserved for growth. FIG. 7 represents an exemplary format for a modified Connection Setup Message 700 according to the present invention. The modified Connection Setup Message format 700 includes a conventional field 401 containing information relating to the path of a connection and a conventional field 402 containing information relating to bandwidth required for the connection. Additional fields provided by the present invention include a field 701 containing a service/restoration indicator and a field 702 containing information relating to the amount of bandwidth that is reserved for growth.

Every switch in the path selected for the connection processes the modified Connection Setup Message as follows. When service/restoration indicator field 701 indicates that the connection request is for new service, then only the spare capacity pool for a link (pool 503) is used for the connection setup. The reserved capacity indicated in field 702 (pool 502) is not considered for a new service connection setup. Thus, to successfully set up a new service connection, the spare capacity pool within a link (pool 503) must have sufficient available bandwidth to satisfy both the bandwidth requested for the connection (field 402) and the bandwidth reserved for growth of the connection (field 702). When there is sufficient bandwidth in spare capacity pool 503, the amount of bandwidth requested (402) by the modified Connection Setup Message is removed from spare capacity pool 503 and placed in service capacity pool 501. Any growth bandwidth for the connection (field 702) is also removed from spare capacity pool 503 and placed in the reserved capacity pool 502.

When the indicator field of the modified Connection Setup Message indicates that the connection is for restoration purposes, then both the spare capacity pool and the reserved capacity pool are considered by the switch in response to the modified Connection Setup Message for providing the requested bandwidth. The switch can allocate bandwidth from the spare capacity pool for the restoration connection before allocating the pre-allocated bandwidth from the reserved capacity pool in the event that there is insufficient bandwidth in the spare capacity pool for the restoration connection. Alternatively, the switch can allocate bandwidth from the reserved capacity pool before allocating bandwidth from the spare capacity pool. When bandwidth for restoration is used from the reserved capacity pool regardless of the order of allocation, the bandwidth is marked as "in use" and is not available for "pre-allocated" growth until released. There is no need to pre-allocate bandwidth for growth (field 702) for a restoration connection as the connection is expected to revert back to the original path of the connection before the connection grows.

In order to grow (or, conversely, contract) a connection, a modified Connection Setup Message according to the present invention is used having new values in the appropriate fields of the message. Unless the total size of the connection is being changed, the sum of field 402 containing the bandwidth needed and field 702 containing the reserved bandwidth for growth must be the same as when the previous modified Connection Setup Message for the connection was sent. Each switch in the path processes the modified Connection Setup Message by appropriately adjusting the service capacity pool and the reserved capacity pool. When the connection size is altered, each switch may need to allocate additional bandwidth from the spare capacity pool (when the total connection size is increased) or release capacity into the spare capacity pool (when the total connection size is decreased) along with appropriately modifying the service capacity pool and the reserved service capacity pool.

While the invention has been described in terms of SONET connections, it should be understood that the present invention applies equally to FR, ATM, IP or IP/MPLS networks in which the connection size is more fluid than in PL-type networks, but also requires growth over time and is subject to similar OC48 (or other link size) limits.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method for allocating restoration capacity in a network link in a communications network, the method comprising:

provisioning a common pool of communication capacity in a network link, the common pool of communication capacity including spare capacity for new service and restoration capacity;

provisioning a pool of pre-allocated communication capacity for future growth of at least one connection in the network link, the pool of pre-allocated communication capacity for future growth being available for restoration capacity and not for spare capacity for new service;

allocating communication capacity for a new service connection from the common pool of communication capacity when a connection setup message is for a new service connection; and allocating communication capacity for a restoration connection from at least one of the common pool of communication capacity and the pool of pre-allocated communication capacity for future growth when a connection setup message is for a restoration connection.

2. The method according to claim 1, wherein the communications network is a private line (PL) network.

3. The method according to claim 1, wherein the communications network is a SONET-based network.

4. The method according to claim 1, wherein the communications network is an Asynchronous Transfer Mode (ATM)-based network.

5. The method according to claim 1, wherein the communications network is an Internet Protocol/MultiProtocol Label Switching (IP/MPLS)-based network.

6. The method according to claim 1, wherein the communications network is a frame relay (FR)-based network.

7. The method according to claim 1, wherein at least one connection for which the pool of pre-allocated communication capacity for future growth is provisioned is a compound connection.

8. The method according to claim 1, wherein the step of provisioning the pool of pre-allocated communication capacity is performed in response to a received connection request.

9. The method according to claim 1, wherein the step of provisioning the pool of pre-allocated communication capacity is performed in response to the receiving the connection setup message.

10. The method according to claim 9, wherein the connection setup message includes information relating to an amount of communication capacity reserved for the connection setup.

11. The method according to claim 1, further comprising a step of sending a second connection setup message to another node within the communications network requesting a connection setup after the common pool of communication capacity and the pool of pre-allocated communication capacity are provisioned.

12. The method according to claim 11, wherein the second connection setup message includes information indicating whether the connection setup is for one of a new service connection and a restoration connection, and information relating to an amount of communication capacity reserved for the connection setup.

13. The method according to claim 1, further comprising a step of sending a link state advertisement message to another node within the communications network after the common pool of communication capacity and the pool of pre-allocated communication capacity are provisioned.

14. The method according to claim 13, wherein the link state message includes information relating to restoration capacity of the network link.

15. A system for allocating communication capacity in a network link in a communications network, the system comprising:

a common pool of communication capacity in the network link, the common pool of communication capacity including spare capacity for new service and restoration capacity; and a pool of pre-allocated communication capacity for future growth of at least one connection in the network link, the pool of pre-allocated communication capacity for future growth being available for restoration capacity and not for spare capacity for new service, wherein communication capacity for a new service connection is allocated from the common pool of communication capacity when a connection-setup message is for a new service connection and communication capacity for a restoration connection from at least one of the common pool of communication capacity and the pool of pre-allocated communication capacity for future growth is allocated when A connection setup message is for a restoration connection.

16. The system according to claim 15, wherein the communications network is a private line (PL) network.

17. The system according to claim 16, wherein the communications network is a SONET-based network.

18. The system according to claim 15, wherein the communications network is an Asynchronous Transfer Mode (ATM)-based network.

19. The system according to claim 15, wherein the communications network is an Internet Protocol/MultiProtocol Label Switching (IP/MPLS)-based network.

20. The system according to claim 15, wherein the communications network is a frame relay (FR)-based network.

21. The system according to claim 15, wherein at least one connection for which the pool of pre-allocated communication capacity for future growth is provisioned is a compound connection.

22. The system according to claim 15, wherein the pool of pre-allocated communication capacity is provisioned in response to a connection request received by a node of the communications network connected to the network link.

23. The system according to claim 15, wherein the pool of pre-allocated communication capacity is provisioned in response to a connection setup message received by a node of the communications network connected to the network link.

24. The system according to claim 23, wherein the connection setup message includes information indicating whether the connection setup is for one of a new service connection and a restoration connection, and information relating to an amount of communication capacity reserved for the connection setup.

* * * * *